United States Patent
Falconer et al.

(10) Patent No.: US 10,613,539 B2
(45) Date of Patent: Apr. 7, 2020

(54) AUTONOMOUS VEHICLE TRAJECTORY PLANNING

(71) Applicant: Ford Global Technologies, LLC, Dearborn, MI (US)

(72) Inventors: William Falconer, Detroit, MI (US); Zachary Konchan, Westland, MI (US); Leonard Eber Carrier, Dearborn, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 15/784,432

(22) Filed: Oct. 16, 2017

(65) Prior Publication Data
US 2019/0113924 A1   Apr. 18, 2019

(51) Int. Cl.
*G05D 1/00* (2006.01)
*G05D 1/02* (2020.01)
*B60W 30/00* (2006.01)

(52) U.S. Cl.
CPC ........... *G05D 1/0214* (2013.01); *B60W 30/00* (2013.01); *G05D 1/0088* (2013.01); *G05D 1/0274* (2013.01); *G05D 2201/0213* (2013.01)

(58) Field of Classification Search
CPC ... G05D 1/0088; G05D 1/0274; G05D 1/0214
See application file for complete search history.

(56) References Cited

U.S. PATENT DOCUMENTS

| 5,735,362 | A | 4/1998 | Hrovat et al. |
| 6,356,837 | B1 | 3/2002 | Yokota et al. |
| 6,917,878 | B2 * | 7/2005 | Pechatnikov .......... G01C 21/32 701/411 |
| 7,571,044 | B2 | 8/2009 | Brown et al. |
| 8,996,224 | B1 | 3/2015 | Herbach et al. |
| 2003/0229441 | A1 * | 12/2003 | Pechatnikov .......... G01C 21/32 701/411 |
| 2015/0291170 | A1 | 10/2015 | Mair et al. |
| 2018/0217050 | A1 * | 8/2018 | Heil ........................ B60T 8/172 |

FOREIGN PATENT DOCUMENTS

| JP | 2009078592 A | 4/2009 |
| JP | 2016193698 A | 11/2016 |
| WO | 2013056723 A1 | 4/2013 |

\* cited by examiner

*Primary Examiner* — Jerrah Edwards
(74) *Attorney, Agent, or Firm* — Frank A. MacKenzie; Bejin Bieneman PLC

(57) ABSTRACT

An autonomous vehicle controller includes a memory and a processor programmed to execute instructions stored in the memory. The instructions include detecting that a host vehicle is on a low friction surface, generating a composite map representing locations of a plurality of high friction surfaces, selecting one of the plurality of high friction surfaces, and autonomously navigating the host vehicle to the selected high friction surface by executing a slip control process.

18 Claims, 7 Drawing Sheets

AUTONOMOUS VEHICLE TRAJECTORY PLANNING

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
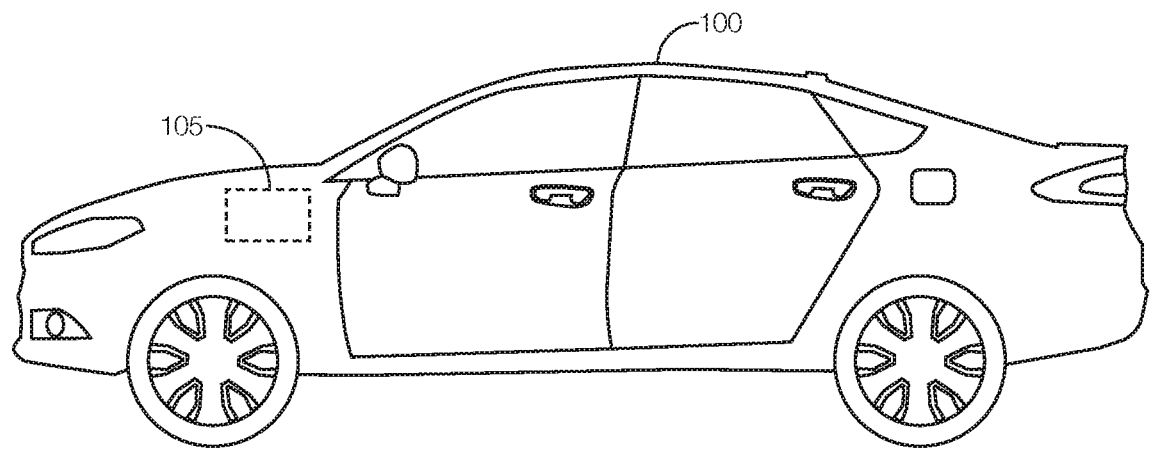
FIG. 1 illustrates an example autonomous host vehicle with an autonomous vehicle controller that can plan a vehicle trajectory to a high friction surface as part of a slip control process.

Vehicle drivers need to be ready for a myriad of circumstances. The same is true for autonomous vehicles controlled by an autonomous vehicle controller, sometimes called a "virtual driver." Human drivers and virtual drivers may encounter a situation where the vehicle is stuck in snow or mud or on an icy surface. Human drivers learn to navigate snowy, muddy, and icy roads through driver's training courses and through experience. Further, a human driver can call a tow truck to help free a stuck vehicle. A virtual driver can be programmed to try to free a stuck autonomous vehicle.

An example autonomous vehicle that can plan a trajectory to a high friction surface as part of a slip control process includes a memory and a processor programmed to execute instructions stored in the memory. The instructions include detecting that a host vehicle is on a low friction surface, generating a composite map representing locations of a plurality of high friction surfaces, selecting one of the plurality of high friction surfaces, and autonomously navigating the host vehicle to the selected high friction surface by executing a slip control process.

In one possible approach, the processor is programmed to generate the composite map to include locations of obstacles. The processor may be programmed to autonomously navigate the host vehicle to the selected high friction surface while avoiding the obstacles. Alternatively or in addition, the processor may be programmed to generate the composite map by generating a first map that includes the locations of the obstacles. In that implementation, the processor may be programmed to generate the composite map by generating the first map to include a path range of the host vehicle. Alternatively or in addition, the processor may be programmed to generate the composite map by generating a second map that includes the locations of the plurality of high friction surfaces. In that possible approach, the processor may programmed to generate the composite map by combining portions of the first map and the second map. Combining portions of the first map and the second map may include incorporating the plurality of high friction surfaces from the second map and the locations of the obstacles from the first map into the composite map.

The processor may be programmed to determine whether the host vehicle has arrived at the selected high friction surface. In that instance, the processor may be programmed to stop executing the slip control process as a result of determining that the host vehicle has reached the selected high friction surface.

An example method includes detecting that a host vehicle is on a low friction surface, generating a composite map representing locations of a plurality of high friction surfaces, selecting one of the plurality of high friction surfaces, and autonomously navigating the host vehicle to the selected high friction surface by executing a slip control process.

In the method, generating the composite map may include generating the composite map to include locations of obstacles. In that instance, autonomously navigating the host vehicle may include autonomously navigating the host vehicle to the selected high friction surface while avoiding the obstacles. Alternatively or in addition, generating the composite map may include generating a first map that includes the locations of the obstacles. Generating the composite map may also or alternatively include generating the first map to include a path range of the host vehicle. Generating the composite map may also or alternatively include generating a second map that includes the locations of the plurality of high friction surfaces. In that instance, generating the composite map may include combining portions of the first map and the second map. Combining portions of the first map and the second map may include incorporating the plurality of high friction surfaces from the second map and the locations of the obstacles from the first map into the composite map.

The method may further include determining whether the host vehicle has arrived at the selected high friction surface. In that instance, the method may further include stopping the slip control process as a result of determining that the host vehicle has arrived at the selected high friction surface.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, an autonomous host vehicle 100 includes an autonomous vehicle controller 105 programmed to control various autonomous vehicle operations. For instance, as explained in greater detail below, the autonomous vehicle controller 105 is programmed to receive sensor signals and output signals to various actuators located throughout the host vehicle 100. By controlling the actuators, the autonomous vehicle controller 105 can autonomously provide longitudinal and lateral control of the host vehicle 100. That is, the autonomous vehicle controller 105 can control propulsion, braking, and steering of the host vehicle 100.

Further, as explained in greater detail below, the autonomous vehicle controller 105 is programmed to detect objects near the host vehicle 100. The objects may include other vehicles, pedestrians, road signs, lane markings, etc. The autonomous vehicle controller 105 is programmed to detect surfaces with low friction (referred to as a "low friction surface," a "low □ surface," or a "low mu surface") and high friction (referred to as a "high friction surface," a "high □ surface," or a "high mu surface"). In some instances, the autonomous vehicle controller 105 is programmed to predict the surface friction of an area near the host vehicle 100, including an area ahead of the host vehicle 100, adjacent to the host vehicle 100, behind the host vehicle 100, or a combination thereof. The autonomous vehicle controller 105 may be programmed to develop a trajectory from a low friction surface to a high friction surface given the obstacles between the host vehicle 100 and the high friction surface.

Although illustrated as a sedan, the host vehicle 100 may include any passenger or commercial automobile such as a car, a truck, a sport utility vehicle, a crossover vehicle, a van, a minivan, a taxi, a bus, etc. As discussed in greater detail below, the host vehicle 100 is an autonomous vehicle that can operate in an autonomous (e.g., driverless) mode, a partially autonomous mode, and/or a non-autonomous mode. The partially autonomous mode may refer to the SAE Level 2 mode of operation where the host vehicle 100 can control steering, acceleration, and braking under certain circumstances without human interaction. The partially autonomous mode may further refer to the SAE Level 3 mode of operation where the host vehicle 100 can handle steering, acceleration, and braking under certain circumstances, as well as monitoring of the driving environment, even though some human interaction is sometimes needed.

Figure 2:
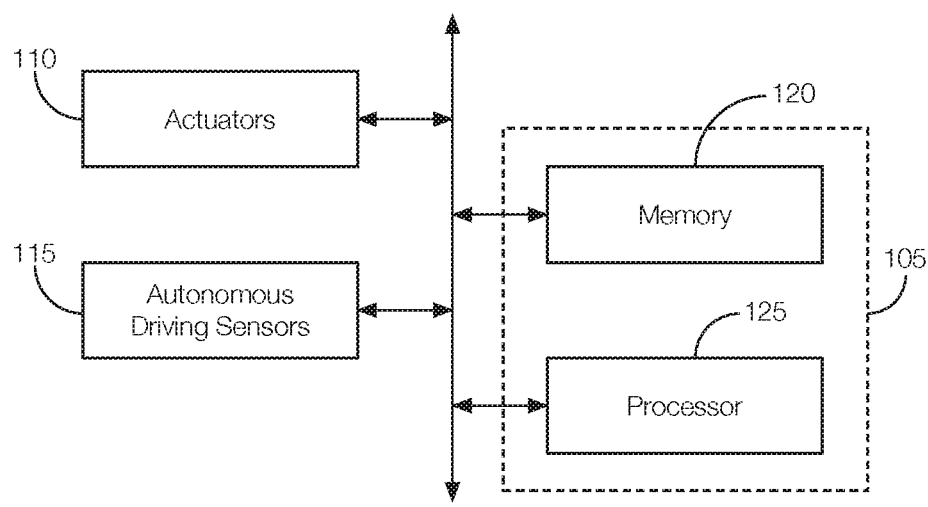
FIG. 2 is a block diagram illustrating example components of the host vehicle.

FIG. 2 is a block diagram showing example components of the host vehicle 100. The components shown in FIG. 2 include actuators 110, autonomous driving sensors 115, a memory 120, and a processor 125.

Each actuator 110 is controlled by control signals output by the processor 125. Electrical control signals output by the processor 125 may be converted into mechanical motion by the actuator 110. Examples of actuators 110 may include a linear actuator, a servo motor, an electric motor, or the like. Each actuator 110 may be associated with a particular longitudinal or lateral vehicle control. For instance, a propulsion actuator may control the acceleration of the host vehicle 100. That is, the propulsion actuator may control the throttle that controls airflow to the engine. In the case of electric vehicles or hybrid vehicles, the propulsion actuator may be, or otherwise control the speed of, an electric motor. A brake actuator may control the vehicle brakes. That is, the brake actuator may actuate the brake pads to slow the vehicle wheels. A steering actuator may control the rotation of the steering wheel or otherwise control the lateral movement of the host vehicle 100, including facilitating turns.

Each actuator 110 may control its respective vehicle subsystem based on signals output by, e.g., the processor 125.

The autonomous driving sensors 115 are implemented via circuits, chips, or other electronic components that are programmed to detect objects external to the host vehicle 100. For example, the autonomous driving sensors 115 may include radar sensors, scanning laser range finders, light detection and ranging (LIDAR) devices, ultrasonic sensors, and image processing sensors such as cameras. Each autonomous driving sensor may be programmed to output signals representing objects detected by the sensor. For instance, the autonomous driving sensors 115 may be programmed to output signals representing objects such as other vehicles, pedestrians, road signs, lane markers, and other objects. Some autonomous driving sensors 115 may be implemented via circuits, chips, or other electronic components that can detect certain internal states of the host vehicle 100. Examples of internal states may include wheel speed, wheel orientation, and engine and transmission variables. Further, the autonomous driving sensors 115 may detect the position or orientation of the vehicle using, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The autonomous driving sensors 115, therefore, may output signals representing the internal vehicle state, the position or orientation of the host vehicle 100, or both. The autonomous driving sensors 115 may be programmed to output the signals to the processor 125 so the processor 125 can autonomously control the host vehicle 100, including detecting when the host vehicle 100 is traveling on a low friction surface, estimating the locations of high friction surfaces, and developing a trajectory to one of the high friction surfaces given any nearby obstacles.

The memory 120 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 120 may store instructions executable by the processor 125 as well as other data. The instructions and data stored in the memory 120 may be accessible to the processor 125 and possibly other components of the host vehicle 100.

The processor 125 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 125 can receive and process the data from the autonomous driving sensors 115 and, from the data, determine whether the host vehicle 100 is on a low friction surface, estimate where high friction surfaces are located, locate obstacles near the host vehicle 100, select one of the high friction surfaces, develop a trajectory from the present location of the host vehicle 100 to one of the high friction surfaces, and autonomously navigate the host vehicle 100 to the high friction surface while avoiding the detected obstacles.

In some instances, the processor 125 may be programmed to determine that the host vehicle 100 is stuck on a low friction surface such as in snow, mud, or on ice. The processor 125 may determine that the host vehicle 100 is stuck on a low friction surface based on signals output by a slip controller. Alternatively, the processor 125 may be programmed to operate as a slip controller. As such, the processor 125 may be programmed to determine that the host vehicle 100 is stuck on a low friction surface based on a slip calculation, which may be calculated from, e.g., wheel torque, wheel speed, or other internal vehicle characteristics, relative to a target slip. The difference between the slip calculation and the target slip may be referred to as a "slip error." The processor 125 may be programmed to conclude that the host vehicle 100 is on a low friction surface when the slip error is above a predetermined threshold. Moreover, in a slip control process, the processor 125 may be programmed to use the slip error to determine if the host vehicle 100 is making progress trying to escape the low friction surface. That is, during the slip control process, the processor 125 may try to keep the wheel torque and speed at a certain slip target to keep up momentum, and thus continue to make progress, on the low friction surface.

The processor 125 may be programmed to generate one or more maps after determining that the host vehicle 100 is on a low friction surface but before and while attempting to move to a high friction surface. Each map may include the locations of high friction surfaces, the locations of detected objects, the locations of low friction surfaces, estimated locations of high friction surfaces, estimated locations of low friction surfaces, a path the host vehicle 100 can travel, or a combination thereof. In some instances, the processor 125 may be programmed to generate a composite map that includes, e.g., the estimated locations of high friction surfaces and the detected obstacles. The processor 125 may be programmed to generate the composite map after selecting one of the high friction surfaces.

The processor 125 may be programmed to output control signals to the actuators 110 to navigate the host vehicle 100 to the selected high friction surface according to the composite map. That is, the processor 125 may be programmed to develop a trajectory, from the composite map, from the present location of the host vehicle 100 to the location of the selected high friction surface. The processor 125 may be programmed to develop the trajectory in a way that the host vehicle 100 avoids the detected obstacles. Developing the trajectory may include the processor 125 outputting certain control signals at certain times to one or more of the actuators 110. The control signals output by the processor 125 cause the actuators 110 to manipulate, e.g., the throttle, brakes, and steering wheel to navigate the host vehicle 100 from its present location to one of the high friction surfaces (i.e., the selected high friction surface) while avoiding the detected obstacles. In some instances, the control signals output by the processor 125 implement the slip control process to escape the low friction surface and direct the host vehicle 100 toward the high friction surface.

Figure 3:
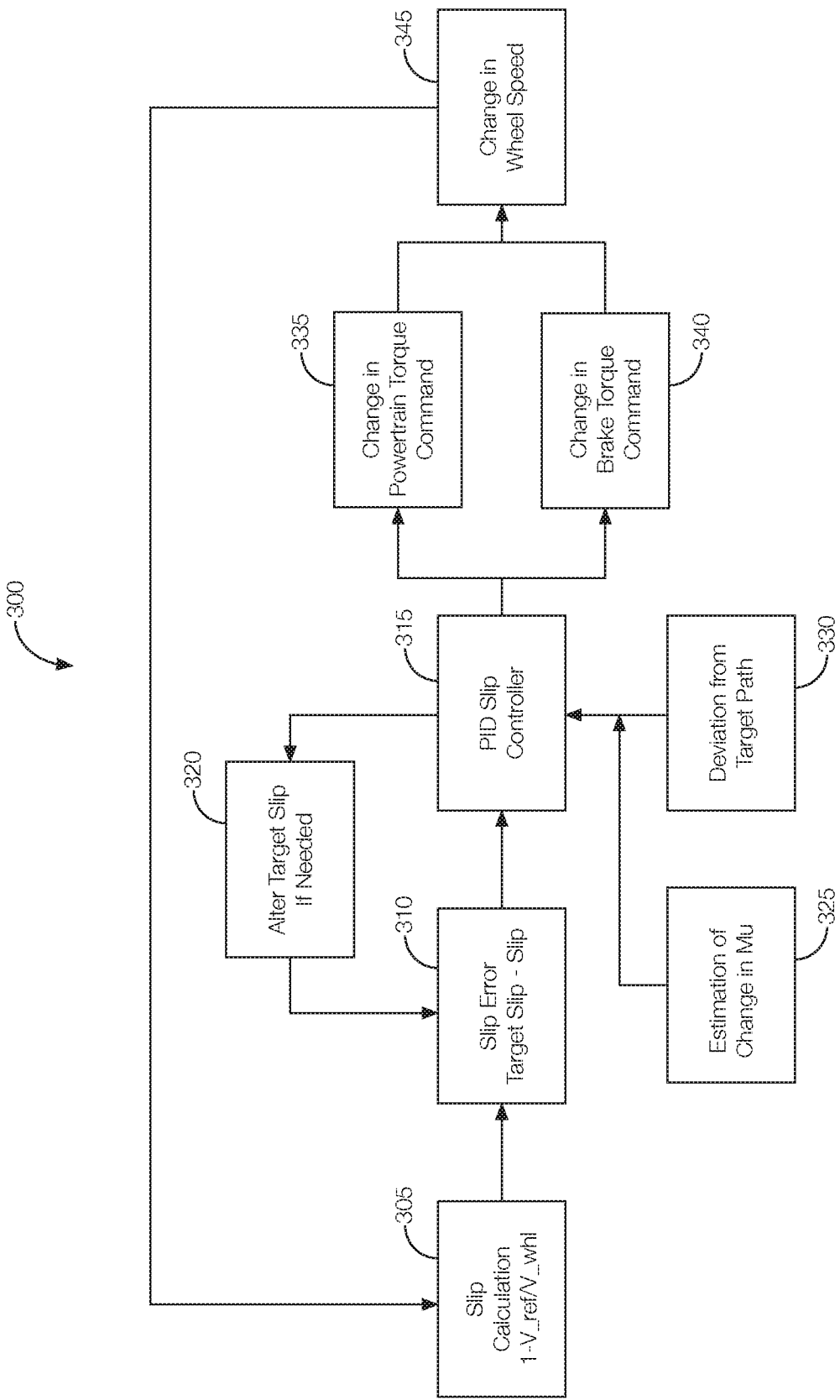
FIG. 3 is a control diagram illustrating various operations of the autonomous vehicle controller during the slip control process.

FIG. 3 is a control diagram 300 illustrating an example slip control process that may be executed by the processor 125 when acting as a slip controller. At block 305, the processor 125 performs a slip calculation. The slip calculation may be a function of the vehicle speed ($V_{ref}$) and wheel speed ($V_{whl}$). Specifically, the slip calculation may be defined as:

$$\text{slip} = 1 - \frac{V_{ref}}{V_{whl}} \quad (1)$$

At block 310, the processor 125 may calculate the slip error. The slip error may be the difference of the target slip value relative to the slip calculated at Equation (1). Block 315 represents a PID slip controller. The output of the PID slip controller includes control signals for the powertrain torque and brake torque given the slip error determined at block 310 as well as other inputs such as the estimation of change in surface friction (block 325) and the deviation from the target path (block 330). Another output of the PID slip controller includes a change to the target slip value (block 320). The processor 125 determines how the change in powertrain torque and brake torque (blocks 335 and 340, respectively) affect the wheel speed (block 345). The change in wheel speed is fed back to block 305 so the new slip can be calculated, a new slip error can be determined, and new output signals can be used to control the powertrain and brakes. Thus, the processor 125 can control the host vehicle 100 to the present slip target and shifting the vehicle gears to gain momentum over successive iterations. Further, as the host vehicle 100 reaches surfaces with higher friction, the processor 125 may apply more steering, acceleration, and braking controls, as well as controlling the host vehicle 100 according to a lower slip target.

The processor 125 may stop executing the control diagram 300 when the host vehicle 100 reaches the endpoint of its intended path with the non-driven wheel speeds matching the driven wheel speeds. In some possible approaches, the processor 125 may be programmed to deactivate the slip control (e.g., terminate execution of the control diagram 300) if certain exit conditions are met. The exit conditions may be based on driver inputs, an imminent collision, a collision that occurs, a low battery condition, a low fuel condition, the processor 125 fails to free the host vehicle 100 after a predetermined number of attempts, etc.

Figure 4A:
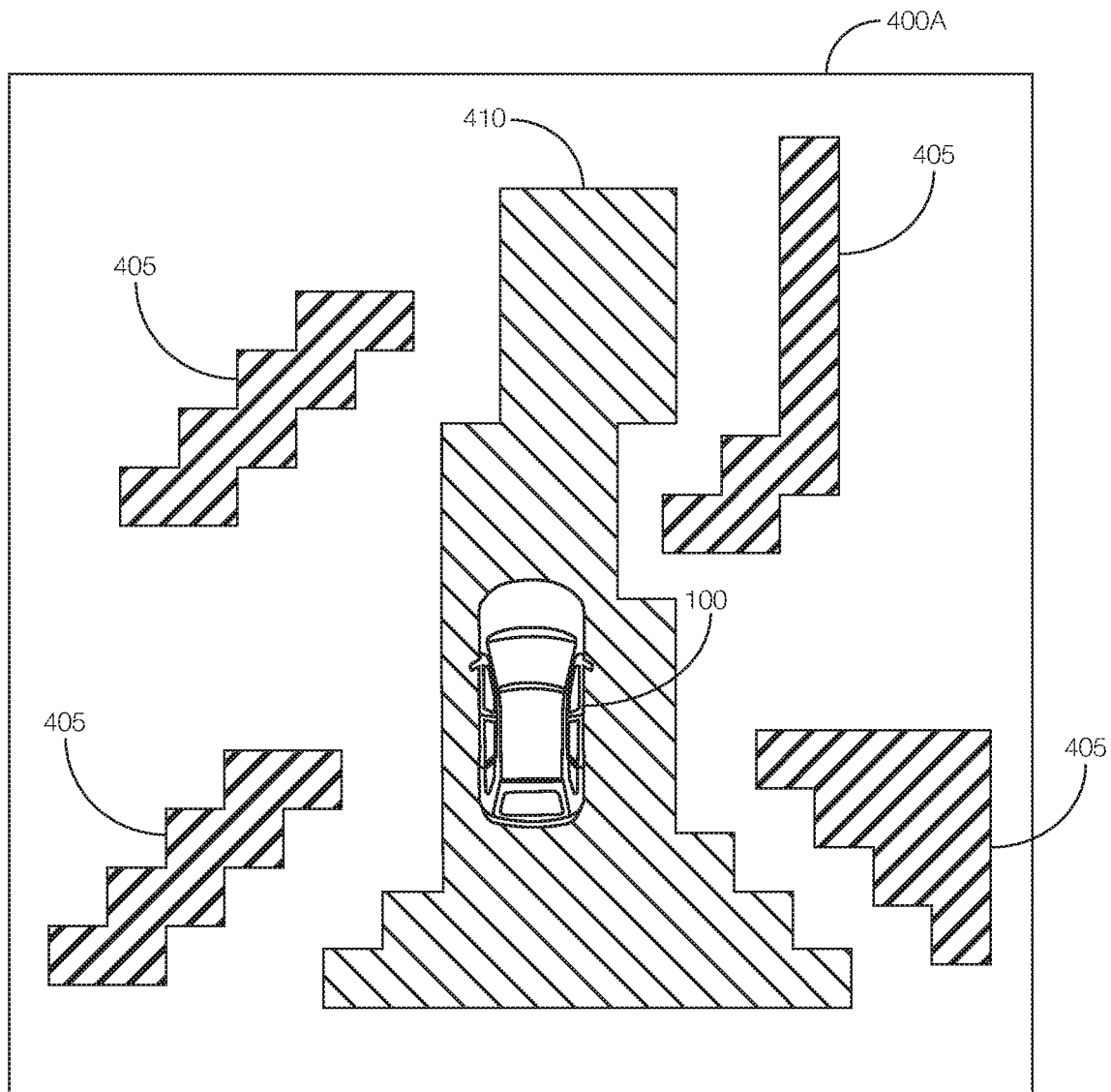
FIGS. 4A-4C illustrate maps generated by the autonomous vehicle controller to develop the vehicle trajectory to the high friction surface and avoid detected obstacles.
Figure 4B:
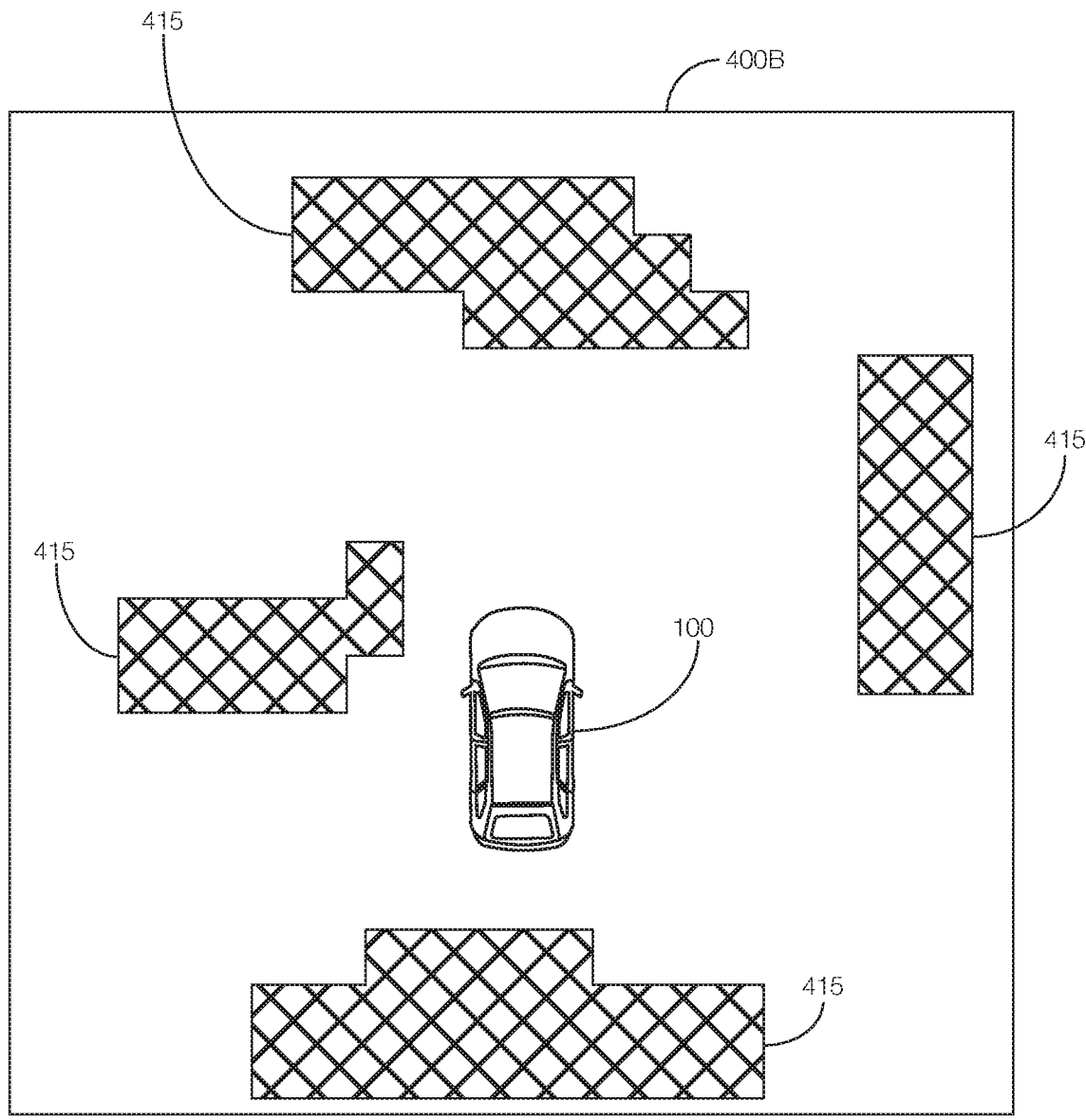
Figure 4C:
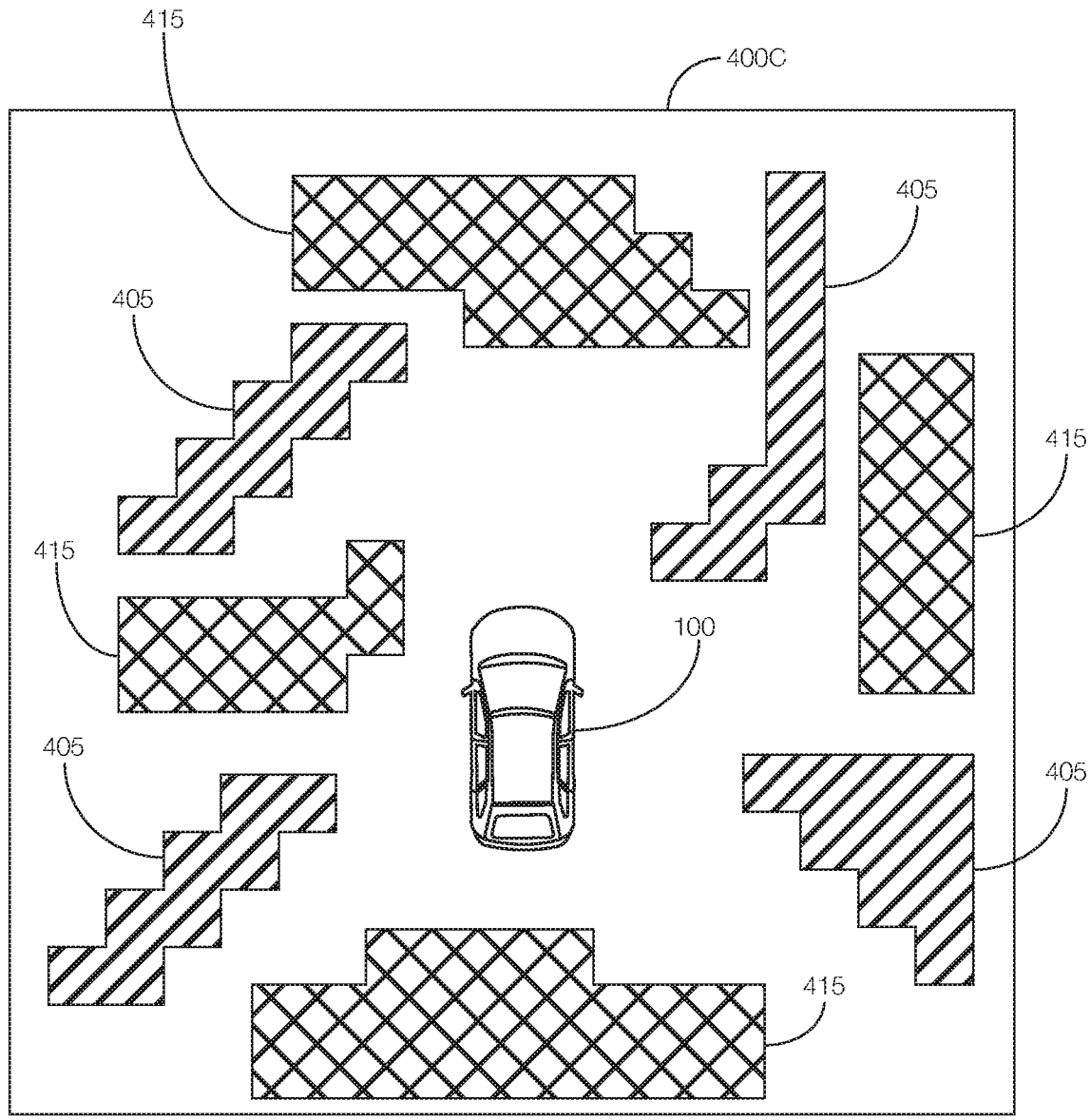

FIGS. 4A-4C illustrate example maps 400A-400C, respectively, that may be generated by the processor 125. The maps 400A-C may be used to develop a trajectory to a high friction surface after, e.g., the processor 125 determines that the host vehicle 100 is stuck on a low friction surface. That is, the processor 125 may use a slip control process, such as the slip control process shown in the control diagram 300, to control the host vehicle 100 to a selected high friction surface identified in one or more of the maps 400A-C.

FIG. 4A shows an example map 400A with obstacles 405 detected by the autonomous driving sensors 115 as well as a path range 410. The path range 410 may be calculated by the processor 125 and may be based on the locations of the obstacles 405 and the operating constraints (e.g., the size and turning radius) of the host vehicle 100. In other words, the path range 410 may be based on the areas of the map the host vehicle 100 can travel to from its current location while avoiding the obstacles 405 with some buffer.

FIG. 4B shows an example map 400B of the locations of estimated high friction surfaces 415. The processor 125 may estimate where the high friction surfaces 415 are located, and the result may be a map like map 400B. The estimated high friction surfaces may be areas that are not covered by snow, mud, ice, etc. as determined, by the processor 125, from data collected by the autonomous driving sensors 115.

FIG. 4C shows an example composite map 400C. The composite map 400C may include elements of the maps 400A and 400B. That is, the composite map 400C may be generated by combining portions of map 400A and map 400B. For instance, the composite map 400C shows the obstacles 405 and the locations of the high friction surfaces 415. In some instances, the map 400C may also show the path range 410. Using the map 400C, the processor 125 can plan a route from the present location of the host vehicle 100 to one of the high friction surfaces 415. That is, the processor 125 may select one of the high friction surfaces 415 based on, e.g., which high friction surface 415 is easiest for the host vehicle 100 to navigate to while avoiding obstacles 405. Any high friction surfaces 415 that at least partially overlap the path range 410 (from FIG. 4A) may be candidates for the selected high friction surface 415. Put another way, the processor 125 may be programmed to select the high friction surface 415 from among those that the host vehicle 100 can navigate to via, e.g., the path range 410. This may be so even when the path range 410 is not included in the composite map 400C. The processor 125 may develop a trajectory from the present location of the host vehicle 100 to the selected high friction surface 415 and output various control signals consistent with, e.g., the control diagram 300 to free the host vehicle 100 from the low friction surface and get the host vehicle 100 to the high friction surface 415. Once at the selected high friction surface, the slip control process may end and the processor 125 may return to normal (i.e., more conventional) autonomous control the host vehicle 100.

Further, in some instances, the processor 125 may be programmed to continually update the maps 400A-C. That is, the processor 125 may be programmed to update any one or more of the maps 400A-C as the processor 125 attempts to free the host vehicle 100 from the low friction surface so, e.g., the processor 125 can account for new obstacles 405, newly estimated high friction surfaces 415, newly detected low friction surfaces, etc. In some instances, the processor 125 may select a new high friction surface 415 that is discovered after the processor 125 selects an initial high friction surface.

Figure 5:
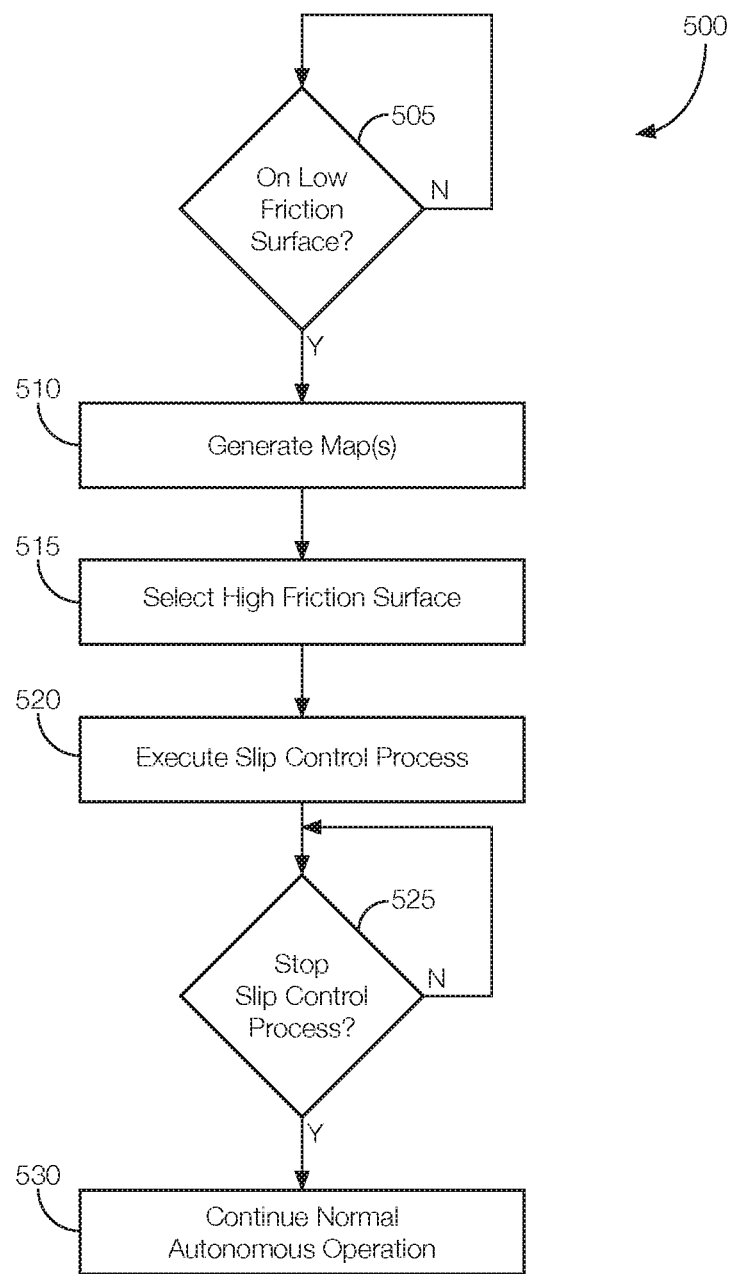
FIG. 5 is a flowchart of an example process that may be executed by the autonomous vehicle controller to plan the vehicle trajectory to the high friction surface.

FIG. 5 is a flowchart of an example process 500 that may be executed by the autonomous vehicle controller 105. The process 500 may be executed at any time while the host vehicle 100 is operating autonomously. The process 500 may continue to execute so long as the host vehicle 100 continues to operate in an autonomous mode.

At decision block 505, the autonomous vehicle controller 105 determines if the host vehicle 100 is on a low friction surface. The processor 125 may be programmed to determine that the host vehicle 100 is on the low friction surface based on signals output by the autonomous driving sensors 115. For instance, the processor 125 may be programmed to determine that the host vehicle 100 is on the low friction surface based on internal states of the host vehicle 100 such as, e.g., wheel speed, wheel orientation, and engine and transmission values. If the processor 125 determines that the host vehicle 100 is on a low friction surface, the process 500 may proceed to block 510. Otherwise, block 505 may be repeated until the processor 125 determines that host vehicle 100 is on a low friction surface or the process 500 ends.

At block 510, the autonomous vehicle controller 105 generates at least one map. The processor 125 may be programmed to generate one or more maps that include obstacles detected by the autonomous driving sensors 115. That is, the processor 125 may be programmed to identify any objects detected by the autonomous driving sensors 115 as obstacles and generate the map to show the locations of the obstacles. The processor 125 may be programmed to generate multiple maps. A first map may include the obstacles and a path range. A second map may include the estimated locations of high friction surfaces. A third map may be a composite map showing, e.g., obstacles and the locations of high friction surfaces.

At block 515, the autonomous vehicle controller 105 selects one of the high friction surfaces in the composite map. The processor 125 may be programmed to select the high friction surface that the host vehicle 100 is most likely to get to given the present location of the host vehicle 100, the locations of the obstacles, etc. The processor 125 may further be programmed to consider whether other low friction surfaces are near the high friction surfaces. That is, the processor 125 may prioritize high friction surfaces based on, e.g., whether the high friction surface is at least partially surrounded by low friction surfaces, obstacles, or a combination of both. The processor 125 may further prioritize high friction surfaces ahead of the host vehicle 100 over high friction surfaces behind the host vehicle 100 to reduce the likelihood that the host vehicle 100 will become stuck at the same low friction surface again. The process 500 may proceed to block 520 after the high friction surface is selected.

At block 520, the autonomous vehicle controller 105 executes a slip control process to escape the low friction surface and move toward the selected high friction surface. The processor 125 may be programmed, for example, to execute a slip control process such as the slip control process 300 discussed above and shown in FIG. 3. Additional details about the slip control process are discussed below.

At decision block 525, the autonomous vehicle controller 105 determines whether to stop the slip control process at block 520. The processor 125 may be programmed to determine whether the host vehicle 100 has arrived at the selected high friction surface or otherwise escaped the low friction surface. The processor 125 may be programmed to make such a determination based on the internal vehicle states detected while executing the slip control process 300, using location data (such as GPS data), or the like. Moreover, upon arriving at the selected high friction surface, the processor 125 may be programmed to determine whether the selected high friction surface provides enough friction to operate the host vehicle 100 without the slip control process 300. If the processor 125 decides to stop the slip control process 300, the process 500 may proceed to block 530. Otherwise, the process 500 may continue to execute block 525. In instances where the processor 125 determines that the host vehicle 100 has reached the selected high friction surface but is still not able to get sufficient traction to control the host vehicle 100 without the slip control process 300, the process 500 may return to block 520 or to block 510 so new maps can be generated, new high friction surfaces can be evaluated, a new high friction surface can be selected, and the slip control process 300 can be executed again.

At block 530, the autonomous vehicle controller 105 continues normal autonomous operation of the host vehicle 100. That is, the processor 125 may stop executing the slip control process and begin outputting control signals to the actuators 110 based on the external signals received from the autonomous driving sensors 115 without relying on the slip control process 300 to control the host vehicle 100. The process 500 may end after block 530.

The slip control process 300, mentioned above, allows the host vehicle 100 to escape a low friction surface. The slip control process (sometimes referred to as "escape mode") involves controlling braking, powertrain torque, gear shifting, and steering inputs to free the host vehicle 100 from a stuck condition, such as when the host vehicle 100 is stuck in deep snow. The host vehicle 100 can engage the escape mode automatically when it detects that the host vehicle 100 is on a low friction surface. Alternatively or in addition, the host vehicle 100 can engage the escape mode in response to a user input provided by an occupant pressing a button or otherwise selecting the escape mode from inside the passenger compartment of the host vehicle 100. The user input may be received via, e.g., an infotainment system. Further, in some instances, if the host vehicle 100 detects that it is stuck, it may prompt the occupant, via the infotainment system, to activate the escape mode.

As a result of receiving the user input activating the escape mode, or as a result of the autonomous vehicle controller 105 deciding that the host vehicle 100 is stuck, the slip control process 300, described above, may begin. That is, the autonomous vehicle controller 105, beginning with the steering wheel centered, may apply powertrain torque to the driven wheels, measuring wheel speed and wheel slip to control the wheel speed to an optimal target, as previously discussed. The autonomous vehicle controller 105 shifts the gear toward the desired direction and continuously monitors the non-driven wheels to determine if they begin to spin. If the non-driven wheels being to spin, the autonomous vehicle controller 105 may determine that the car is moving out of the stuck position. If the non-driven wheels do not spin, stop spinning, or slow to below a predetermined threshold, the autonomous vehicle controller 105 shifts the gears and drives the host vehicle 100 in the opposite direction to oscillate (e.g., rock) the host vehicle 100, back-and-forth, until the driven wheels stop slipping and the non-driven wheels roll normally. The autonomous vehicle controller 105 may further test various steering angles to try to find a path out of the stuck condition, especially if the attempts to rock the host vehicle 100 fail to make significant progress. The autonomous driving sensors can be used to avoid collisions with nearby objects during this slip control process, as previously discussed.

If the autonomous vehicle controller 105, operating in the escape mode, fails to free the host vehicle 100 after a set number of attempts, or if the non-driven wheels are not able to gain peak speed, the autonomous vehicle controller 105 may report "unable to escape," which could include returning control to the driver (assuming an occupant is present) and can also make suggestions to the driver on how best to escape. Some driver inputs, such as brake pedal depress, accelerator depress, steering wheel angle, may cause the autonomous vehicle controller 105 to exit the escape mode and give full control back to the driver. Other conditions that may cause the vehicle to exit the escape mode are battery voltage below a set threshold, fuel level below a set threshold, if certain diagnostic trouble codes are set, or if a collision is imminent or occurs.

With this approach, the autonomous vehicle controller 105 tests different steering wheels and angles as the host vehicle 100 is rocked back-and-forth while monitoring the wheel speed of both driven and non-driven wheels. The autonomous vehicle controller 105 looks for the wheels speeds of the driven and non-driven wheels to converge for a certain period of time as opposed to just monitoring the driven wheels and vehicle acceleration.

An example slip control process, performed during the escape mode, may be as follows. Initially, the autonomous vehicle controller 105 may determine if the host vehicle 100 needs to move forward or backward from its current location. Moreover, the autonomous vehicle controller 105 may initialize a counter that counts the number of times (i.e., iterations) the autonomous vehicle controller 105 will attempt to free the stuck host vehicle 100.

After selecting the direction and initializing the counter, the autonomous vehicle controller 105 may take a rolling average of the non-driven wheel speeds to estimate the velocity of the host vehicle 100. The non-driven wheel speeds may have some marginal slip relative to the slip of the driven wheel speeds. The rolling average may be used to remove noise in the data, such as from the road surface variation caused by, e.g., snow. The autonomous vehicle controller 105 may be programmed to detect that the rolling average velocity is decreasing and compare the rolling average to a predetermined threshold. As a result of determining that the rolling average is decreasing and has dropped below the predetermined threshold, the autonomous vehicle controller 105 may determine the host vehicle 100 is no longer gaining momentum to escape the stuck condition. The autonomous vehicle controller 105 may compare the number of iterations in the counter to an attempt limit. If the attempt limit has not yet been reached, the autonomous vehicle controller 105 may increment the counter and continue to determine the rolling average and compare that to the predetermined threshold, as described above. If the number of iterations meets or exceeds the attempt limit, the autonomous vehicle controller 105 may shift the vehicle into the opposite gear (e.g., "reverse" if the host vehicle 100 was previously trying to move forward; "drive" if the host vehicle 100 was previously trying to move backward) and try again to free the stuck host vehicle 100.

After the vehicle has been shifted into the opposite gear, the autonomous vehicle controller 105 may begin to cause the host vehicle 100 to accelerate. The autonomous vehicle controller 105 may continue to calculate and monitor the rolling average velocity and determine if the rolling average velocity is decreasing and has dropped below the predetermined threshold. If so, the autonomous vehicle controller 105 may again conclude that the host vehicle 100 is not gaining enough momentum to escape. Then, the autonomous vehicle controller 105 may increase the iteration and determine if the peak velocity of the host vehicle 100 during each movement mode at the steering angle has been increasing. If so, the autonomous vehicle controller 105 may return to attempting to free the stuck host vehicle 100 in the target (e.g., previous) gear that causes the host vehicle 100 to move in the original direction (e.g., the target direction). Otherwise, the autonomous vehicle controller 105 may determine that the current steering angle is not helping the host vehicle 100 escape. In that instance, the autonomous vehicle controller 105 may command the host vehicle 100 to attempt to free itself using a different steering angle, discussed in greater detail below. Also, the host vehicle 100 may not be expected to escape from this direction (e.g., the direction of the opposite gear). If the rolling average velocity has exceeded a value for a given period of time, or if the calculated displacement is too far from the starting position, to avoid moving into an environmental hazard, the autonomous vehicle controller 105 may command the host vehicle 100 to change the gear back to the target direction and perform the part of the process associated with moving in the target direction, discussed above.

When a new steering angle is requested, the autonomous vehicle controller 105 may vary the current angle by a calibrated amount. Making this request successive times may prevent the host vehicle 100 from trying to free itself using the same steering angle as a failed attempt. At each new steering angle, the host vehicle 100 may go into the normal oscillating motion (e.g., rocking back-and-forth) and attempt to free itself. If the steering angle fails, a new angle may be tested until a desired result is achieved or a failure condition exits the escape mode. FIGS. 6A-6D illustrate an example host vehicle 100 operating in the escape mode, discussed above, to escape a stuck condition. The host vehicle 100 in FIGS. 6A-6D is on an uneven low friction surface (e.g., a muddy road, a snowy road, an icy road, etc.). The arrows indicate the direction of the momentum of the host vehicle 100.

Figure 6A:
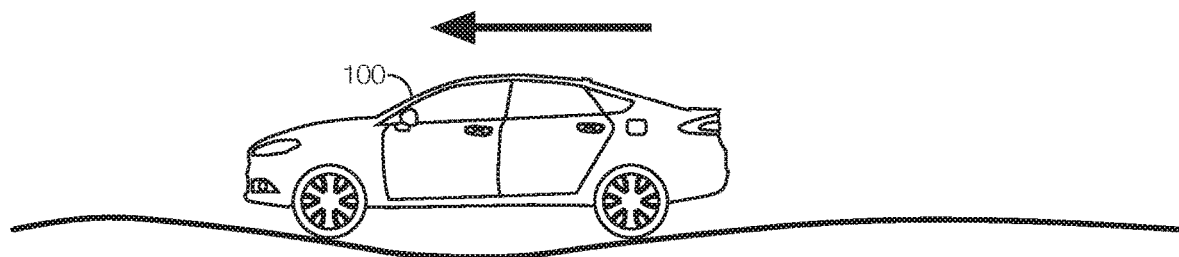
FIGS. 6A-6D illustrate an example autonomous host vehicle performing an example slip control process on a low friction surface.
Figure 6B:
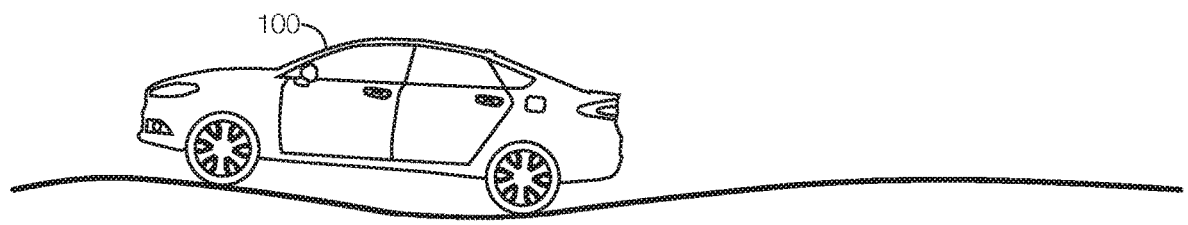
Figure 6C:
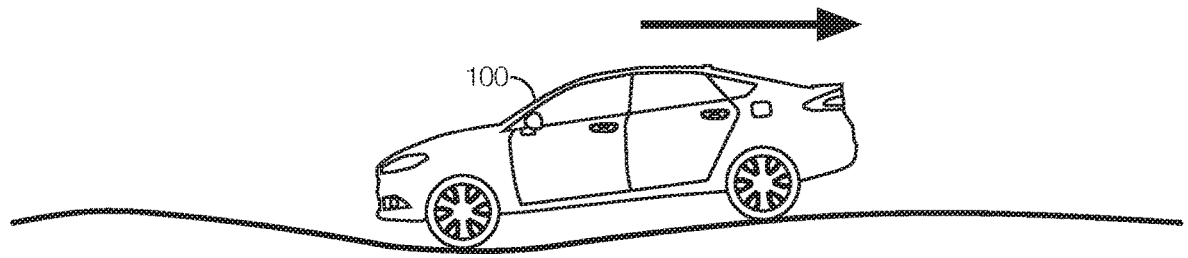
Figure 6D:

In FIG. 6A, the autonomous vehicle controller 105 determines that the host vehicle 100 is unable to progress normally (e.g., move in a straightforward manner). Thus, the autonomous vehicle controller 105 initiates the escape mode and selects a target direction. The autonomous vehicle controller 105 then rocks the host vehicle 100 back-and-forth to attempt to make progress in the target direction. FIG. 6B illustrates an instance where the host vehicle 100 is unable to make progress in the target direction. That is, the host vehicle 100 is unable to clear the uneven road surface. In this instance, the autonomous vehicle controller 105 switches to the opposite gear (reverse in the view shown in FIG. 6B). With reference to FIG. 6C, the autonomous vehicle controller 105 commands the host vehicle 100 to accelerate backwards so that the host vehicle 100 can have additional energy to clear the uneven road surface. Referring to FIG. 6D, the host vehicle 100 is free after multiple iterations of FIGS. 6A-6C (e.g., multiple iterations of building energy by rocking the host vehicle 100 back and forth). That is, in FIG. 6D, the host vehicle 100 has gained enough momentum to overcome the stuck condition (e.g., clear the uneven road surface despite it being low friction). Once clear, the host vehicle 100 is free to continue in the target direction.

This approach, when combined with the generation of the composite map, give the autonomous vehicle controller 105 a greater chance at freeing the host vehicle 100 from a stuck condition.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An autonomous vehicle controller comprising:
    a memory; and
    a processor programmed to execute instructions stored in the memory, the instructions including
        detecting that a host vehicle is on a low friction surface,
        then, in response to detecting that the vehicle is on the low friction surface, generating a composite map representing locations of a plurality of high friction surfaces and locations of obstacles,
        selecting one of the plurality of high friction surfaces, and
        autonomously navigating the host vehicle from the low friction surface to the selected high friction surface according to the composite map, including the locations of the plurality of high friction surfaces and the locations of the obstacles represented by the composite map, by executing a slip control process.

2. The autonomous vehicle controller of claim 1, wherein the processor is programmed to autonomously navigate the host vehicle to the selected high friction surface while avoiding the obstacles.

3. The autonomous vehicle controller of claim 1, wherein the processor is programmed to generate the composite map by generating a first map that includes the locations of the obstacles.

4. The autonomous vehicle controller of claim 3, wherein the processor is programmed to generate the composite map by generating the first map to include a path range of the host vehicle.

5. The autonomous vehicle controller of claim 3, wherein the processor is programmed to generate the composite map by generating a second map that includes the locations of the plurality of high friction surfaces.

6. The autonomous vehicle controller of claim 5, wherein the processor is programmed to generate the composite map by combining portions of the first map and the second map.

7. The autonomous vehicle controller of claim 6, wherein combining portions of the first map and the second map includes incorporating the plurality of high friction surfaces from the second map and the locations of the obstacles from the first map into the composite map.

8. The autonomous vehicle controller of claim 1, wherein the processor is programmed to determine whether the host vehicle has arrived at the selected high friction surface.

9. The autonomous vehicle controller of claim 8, wherein the processor is programmed to stop executing the slip control process as a result of determining that the host vehicle has reached the selected high friction surface.

10. A method comprising:
    detecting that a host vehicle is on a low friction surface,
    then, in response to detecting that the vehicle is on the low friction surface, generating a composite map representing locations of a plurality of high friction surfaces and locations of obstacles,
    selecting one of the plurality of high friction surfaces, and
    autonomously navigating the host vehicle from the low friction surface to the selected high friction surface according to the composite map, including the locations of the plurality of high friction surfaces and the locations of the obstacles represented by the composite map, by executing a slip control process.

11. The method of claim 10, wherein autonomously navigating the host vehicle includes autonomously navigating the host vehicle to the selected high friction surface while avoiding the obstacles.

12. The method of claim 10 wherein generating the composite map includes generating a first map that includes the locations of the obstacles.

13. The method of claim 12, wherein generating the composite map includes generating the first map to include a path range of the host vehicle.

14. The method of claim 12, wherein generating the composite map includes generating a second map that includes the locations of the plurality of high friction surfaces.

15. The method of claim 14, wherein generating the composite map includes combining portions of the first map and the second map.

16. The method of claim 15, wherein combining portions of the first map and the second map includes incorporating the plurality of high friction surfaces from the second map and the locations of the obstacles from the first map into the composite map.

17. The method of claim 10, further comprising determining whether the host vehicle has arrived at the selected high friction surface.

18. The method of claim 17, further comprising stopping the slip control process as a result of determining that the host vehicle has arrived at the selected high friction surface.

* * * * *